United States Patent [19]

Fujioka

[11] 4,147,242

[45] Apr. 3, 1979

[54] POWER TRANSMISSION FOR USE IN INDUSTRIAL VEHICLE DRIVELINE AND EQUIPPED WITH FLUID ACTUATED CLUTCHES

[75] Inventor: Kazuyoshi Fujioka, Tokyo, Japan

[73] Assignee: Nissan Motor Company, Limited, Japan

[21] Appl. No.: 832,381

[22] Filed: Sep. 12, 1977

[30] Foreign Application Priority Data

Sep. 14, 1976 [JP] Japan .............................. 51-123743[U]

[51] Int. Cl.² .............................................. F16D 67/00
[52] U.S. Cl. ................................. 192/4 A; 192/13 R; 74/688; 60/339
[58] Field of Search ................. 192/4 A, 13 R, 109 F; 74/688, 754, 784; 60/339

[56] References Cited

U.S. PATENT DOCUMENTS

| | | | |
|---|---|---|---|
| 3,757,915 | 9/1973 | Momose | 192/4 A X |
| 3,863,523 | 2/1975 | Starling et al. | 192/4 A X |
| 3,948,366 | 4/1976 | Kitano et al. | 192/13 R X |

*Primary Examiner*—Edgar W. Geoghegan
*Attorney, Agent, or Firm*—Robert E. Burns; Emmanuel J. Lobato; Bruce L. Adams

[57] ABSTRACT

Fluid actuated clutches are equipped with friction facings made of impregnated paper which operate in hydraulic fluid. Valves which control the transmission supply an increased amount of lubrication fluid to the friction facings when the clutches are dispositioned to be semi-engaged.

4 Claims, 4 Drawing Figures

POWER TRANSMISSION FOR USE IN INDUSTRIAL VEHICLE DRIVELINE AND EQUIPPED WITH FLUID ACTUATED CLUTCHES

BACKGROUND OF THE INVENTION

The present invention relates to a power transmission for use in the driveline of an engine-powered industrial vehicle such as a forklift or a shovel loader and of the type equipped with fluid actuated clutches of which friction facings operate in hydraulic fluid.

A conventional power transmission of the above-mentioned type is equipped with a fluid control system, which is constructed to initially regulate fluid pressure produced by a pump to a predetermined value and thereafter supply the regulated pressure to a manual selector valve which in turn distributes the regulated pressure to one of the clutches in accordance with the shift position of the selector valve which is manually operated by a vehicle driver whereby a forward drive power train or a reverse drive power train is accomplished.

As is well known in the art, the power transmission mounted on the industrial vehicle is quite frequently subjected to such an operative condition that its clutches are operated in a semi-clutched condition. The semi-clutched condition will be used throughout this disclosure to indicate the operative condition of a clutch wherein its friction surfaces are held loosely in contact with each other for allowing the slippage or the relative movement therebetween whereby the clutch can transmit a small amount of the torque from the driving member to the driven member.

Such frequent slippage causes the friction facings to generate heat and to wear excessively. In order to prevent such excessive heat generation and wear, it is necessary to lubricate the friction facings with a hydraulic fluid.

Two types of clutches to be incorporated in the power transmission of an industrial vehicle are known in the art, one type of which has friction facings made of metal and the other type of which has friction facings made of impregnated paper. The clutch equipped with metal friction facings is superior to a clutch equipped with paper friction facings in that the amount of fluid necessary for lubricating the former clutch is less than that necessary for lubricating the latter clutch. Furthermore, the resistance to wear of a metal friction facing is far superior to that of a paper friction facing.

However, a metal friction facing is far more expensive than a paper friction facing thus making the cost of the clutch equipped with metal friction facings quite high.

In order to reduce the cost of the power transmission of an industrial vehicle, it is therefore desirable to employ a clutch equipped with paper friction facings instead of a clutch equipped with metal friction facings.

In case clutches equipped with paper friction facings are employed, however, it is necessary to construct the fluid control system of the power transmission such that it can supply the clutches with adequate amounts of lubrication fluid, which makes the fluid control system quite complicated as will be apparent from the following, thus increasing the cost thereof to the extent of counterbalancing the reduced cost which is accomplished by employing the clutch equipped with paper facings.

For the reasons discussed above, clutches equipped with metal friction facings have been employed for almost all conventional power transmissions for use in industrial vehicles.

Referring to FIG. 1, explanation of a conventional fluid control system for controlling a power transmission equipped with friction clutches having paper friction facings is made.

In FIG. 1, an engine 10 drives a hydraulic pump 12 which pumps hydraulic fluid from a fluid reservoir 14 through a screen 16 to supply fluid pressure to clutches 18 and 20 by way of a relief valve 22 in the form of a normally closed valve, a variable throttle 24 and a manual selector valve 26 in the form of a four-way-three position (4/3) valve. The selector valve 26 is operable to selectively distribute the fluid under pressure to one of the clutches 18 and 20 in accordance with its shift position selected by a vehicle driver whereby the vehicle is driven by engine 10 in the forward or reverse direction, or held to stall. Reference character 28 indicates a pressure regulator valve which is operable to regulate the pressure supplied to actuate the required clutch to a predetermined value, e.g., when the pressure exceeds the predetermined value the regulator valve opens its drain port thereby to exhaust the excess pressure. The pressure regulator valve 28 is further operable, in response to the movement of a piston 30 which is usually operatively connected to a brake pedal (not shown), to reduce or eliminate the clutch actuation pressure thereby to move the clutch from an engaged position to a semi-clutched or declutched position. When the clutch is moved as above by the operation of the piston 30, the relief valve 22 is closed in order to retain a proper supply of fluid from the pump 12 to a torque converter 32 so that the proper converter pressure is maintained. The torque converter 32 is supplied with fluid under pressure discharged from the pump 12 via a flow restriction 34 and partially exhausts its working fluid into a return flow passage 36 in which is arranged a relief valve 38 for maintaining the converter pressure at a predetermined value, for example at 3 kg/cm$^2$. Reference numeral 40 indicates an emergency relief valve which is operable to drain an excessive portion of the fluid supplied to the torque converter when the supply of fluid becomes excessive thereby preventing breakage of the torque converter. The fluid exhausted from the converter into the return flow passage 36 is conducted via the relief valve 38 to the clutches 18 and 20 for lubrication of their friction facings (not shown).

A lubrication fluid control valve 42 in the form of three way-two-position (3/2) valve is pronded and which is operatively connected to the pressure regulator valve 28 and functions to selectively distribute the fluid drained from the pressure regulator valve to lubrication points of the transmission or the torque converter as follows in accordance with its actuated position. The position of the lubrication control valve 42 is controlled by the combined movement of a first pressure sensing device 44 which is movable in response to changes in the pressure supplied to the torque converter and a second pressure sensing device 46 which is movable in response to changes in the pressure supplied to the clutches. Since the pressure supplied to the torque converter is maintained approximately at a constant value in order to prevent the cavitation of the converter, the lubrication fluid control valve 42 is operable to change its valve position in response to the movement of the piston 30, i.e., when the piston is moved upwardly as viewed in the drawing, the valve 28 opens its drain port thereby to reduce the clutch actuation pressure thus causing the valve 42 to have the position, as depicted in the drawing, where it distributes the fluid drained from the valve 28 to the foregoing lubrication points of the power transmission for example to the idler shafts.

When, on the contrary, the clutch actuation pressure increases, the lubrication control valve 42 is actuated to move to assume a position which is reversed to the position as depicted in the drawing. In this position, the lubrication fluid control valve distributes the fluid drained from the pressure regulator valve 28 to the torque converter through a check valve 48 thus causing the amount of fluid exhausted from the converter to increase thus to increase the amount of lubrication fluid supplied through the relief valve 38 to the clutches for lubrication thereof.

A by-pass passage arranged with a flow restriction 50 provides communication at all times between the pressure regulator valve 28 and the aforementioned lubrication points of the transmission for supplying the fluid drained from the pressure regulator valve 28 to said points.

From the above explanations given to the conventional fluid control system for controlling a power transmission equipped with clutches having friction facings made of impregnated paper, it will be appreciated that the fluid control system of the foregoing type is complicated in construction mainly for the reason that the control system indispensably requires the provision of the relief valve 22 for preventing the converter pressure from falling below a proper value even when the valve 28 is moved by the piston 30 to have a position where it drains the fluid pressure supplied to actuate the appropriate clutch, and the lubrication fluid control valve 42 and the sensing devices 44 and 46 for moving the clutch to a semi-clutched or declutched position when the vehicle brake pedal is depressed moving the piston 30.

The conventional fluid control system of the foregoing type encounters a further drawback that it cannot increase the amount of lubrication fluid supplied to the clutch when the clutch is in a semi-clutched condition. When the clutch is in a semi-clutched condition, the lubrication fluid control valve 42 is in a position to supply the fluid drained from the pressure regulator valve 28 to the transmission lubrication points, for example the idler shafts. In order to prevent excessive heat generation and wear of the friction facings of the clutches, particularly in the case of the friction facings being of impregnated paper, it is quite useful and effective to construct the fluid control system so that it can increase the amount of lubrication fluid supplied to the clutches when they are in a semi-clutched condition.

SUMMARY OF THE INVENTION

It is accordingly an object of the present invention to provide a power transmission for use in a driveline of an industrial vehicle, which is optimally constructed to be able to incorporate clutches having friction facings made of impregnated paper in place of clutches having friction facings made of metal without encountering the foregoing drawbacks.

It is another object of the present invention to provide a power transmission of the above type which includes an improved fluid control system which is simple in structure and therefore economical to manufacture.

It is a further object of the present invention to provide a power transmission of the foregoing type equipped with a fluid control system which functions to provide the clutches with a desirably increased amount of lubrication fluid when the clutches are moved into a semi-clutched position.

BRIEF DESCRIPTION OF THE DRAWINGS

This and other objects and features of the present invention will become apparent from the following description with reference to the accompanying drawings, in which.

BRIEF DESCRIPTION OF THE PREFERRED EMBODIMENTS

Figure 2A:
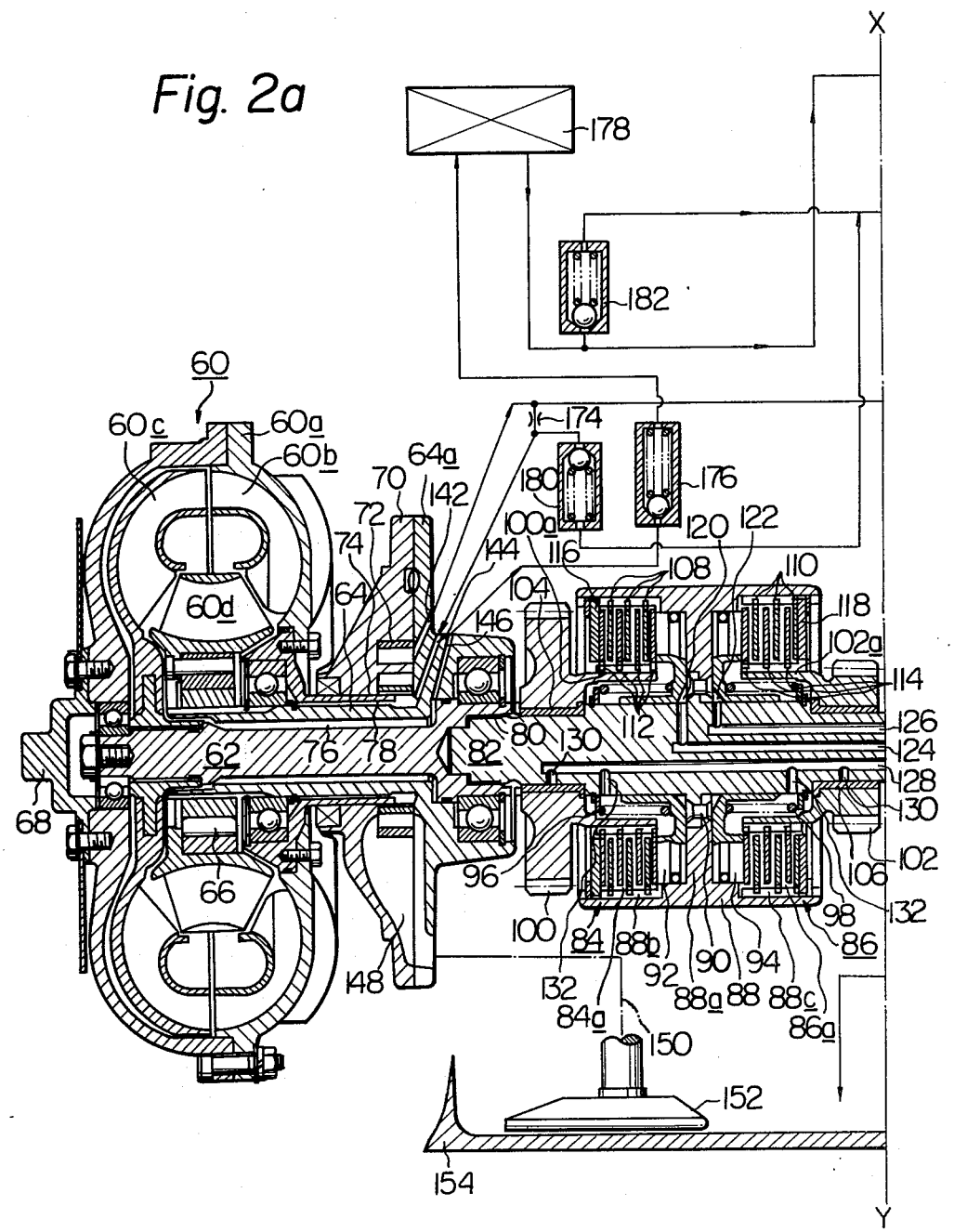
FIGS. 2a and 2b show in cross section a power transmission according to the present invention which includes an improved fluid control system and clutches having friction facings made of impregnated paper.
Figure 2B:
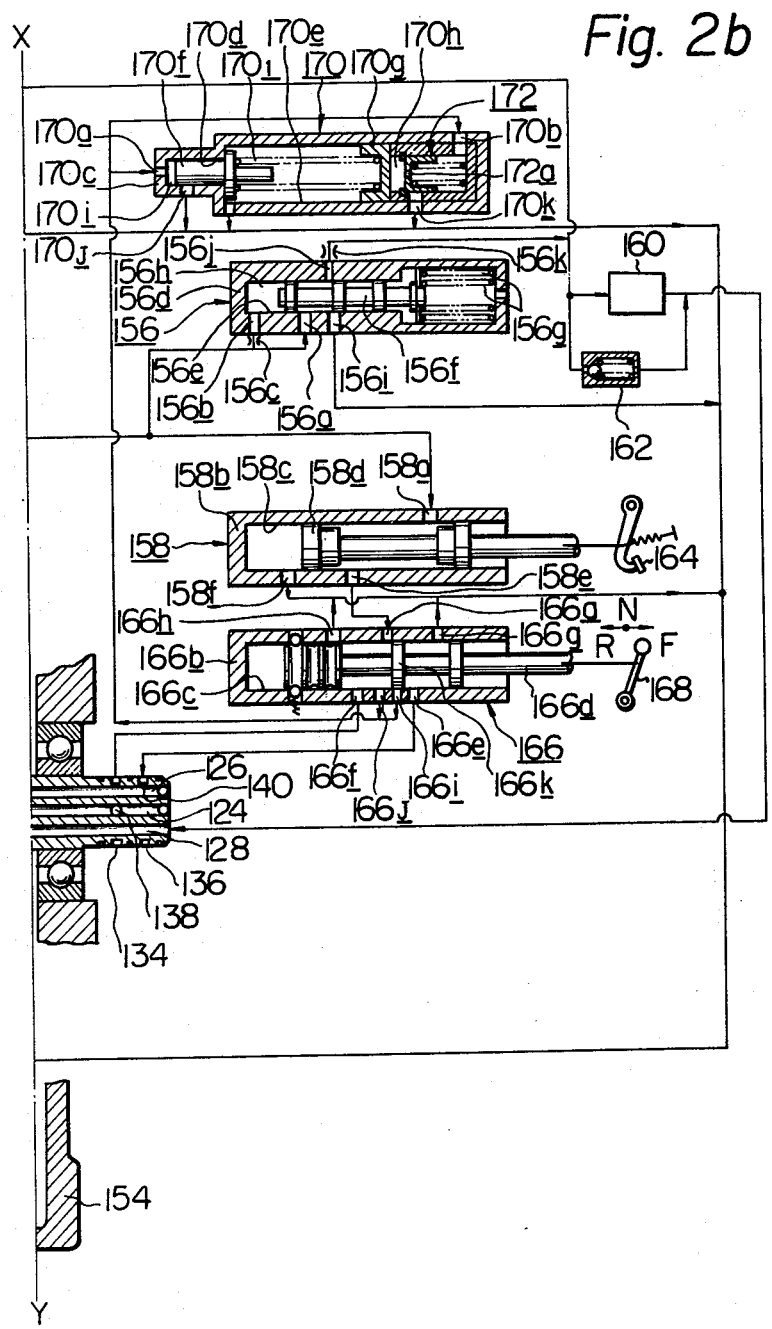

In FIGS. 2a and 2b, designated generally by reference numeral 60 is a torque converter of an ordinary construction which comprises a housing 60a connected in torque transmission relationship to an engine (not shown) of an industrial vehicle, an impeller 60b fixedly connected to the housing 60a, a turbine 60c and a stator 60d. The turbine 60c is drivably connected to an output shaft 62 of the converter. The stator 60d is mounted on a stationary sleeve shaft 64 interposing therebetween a one-way roller clutch 66 for preventing the stator 60d from rotating in a direction reverse to the direction in which an output shaft (not shown) of the engine rotates.

The hydraulic torque converter is of an ordinary construction, therefore a detailed description of same is not believed necessary. In general, however, the torque converter 60 functions to drive the output shaft 62 at an increased torque with respect to the torque applied to an input shaft 68 of the converter. Further, as is well known during operation of such a torque converter, when the impeller 60b is driven by the input shaft through the housing, the fluid within the housing is driven in a toroidal flow path, wherein the fluid impinges on the blades of the turbine 60c to impress a torque thereon causing the turbine to rotate. The torque thus imparted to the turbine, at this time, is higher than the torque impressed on the input shaft 68 due to the function of the stator blades which modify the direction of the fluid flow. Under these conditions the stator is subjected to a force which tends to rotate same in a direction opposite to that in which the impeller is rotating. However rotation of the stator is prevented by the provision of the one-way clutch. Upon the rotational speed of the turbine reaching a predetermined value with respect to the rotational speed of the impeller the one way clutch permits the stator to rotate along with the impeller and the turbine. The torque converter thereupon functions as a simple fluid coupling so that only the torque impressed on the input shaft is impressed on the turbine.

The stationary sleeve shaft 64 is formed with a radially extending flanged portion 64a to which is fixedly secured a pump body 70. The flange portion and the pump body cooperate to receive therewithin a hydraulic pump 72 in the form of a gear pump of an ordinary construction which comprises a large gear with internal teeth in mesh at one point with a small gear which has external teeth. The small gear is operatively connected to the housing 60a through a pump drive sleeve shaft 74 whereby the pump 72 is driven by the output of the engine.

The turbine 60c is splined to the converter output shaft 62 which cooperates with the stationary sleeve shaft 64 to define therebetween an annular fluid passage 76. The annular fluid passage 76 is fluidly connected to the outlet of the torque converter for conducting therein the fluid exhausted from the converter and forms a portion of lubrication fluid conduit means as will be apparent as the description proceeds. The stationary sleeve shaft 64 cooperates with the pump drive sleeve shaft 74 to define therebetween an annular fluid passage 78. The annular fluid passage 78 is fluidly connected to the inlet of the torque converter and communicates with the delivery port of the pump 72 for supplying therethrough pressurized fluid produced by the pump to the torque converter. The passage 78 thus defines a portion of torque converter working fluid supply conduit means as will also be apparent as the description proceeds.

The converter output shaft 62 is splined at 80 to a shaft 82 which serves as an input shaft with respect to clutches 84 and 86. A clutch drum 88 is arranged coaxially with the clutch input shaft 82 and is secured to same by means of rivets 90. The clutch drum 88 is formed with a tranverse partition wall portion 88a which axially divides the hollow interior of the clutch drum into two clutch chambers 84a and 86a. The two clutch chambers respectively receive axially slidably therein pistons 92 and 94 which are respectively biased by return springs 96 and 98 against the partition wall 88a. A forward drive ring gear 100 and a reverse drive ring gear 102 are mounted on the clutch input shaft 80 by respectively interposing therebetween bushings 104 and 106 and are freely rotatable with respect to the clutch input shaft. Although not shown in the drawing, the forward and reverse drive ring gears 100 and 102 are respectively in mesh with forward and reverse drive gearings through which vehicle drive torque is transmitted via one of the clutches 84 and 86 to vehicle wheels. The ring gears 100 and 102 are respectively formed with sleeve extensions 100a and 102a which extend respectively into the corresponding clutch chambers of the clutch drum 88. The clutch drum 88 is formed with internally splined portions 88b and 88c to which are splined driving clutch discs 108 and 110 respectively. The sleeve extensions 100a and 102a have externally splined surfaces to which are splined driven clutch discs 112 and 114. As shown in the drawing, the driving clutch discs 108 and the driven clutch discs 112 are axially alternately arranged to constitute a set of forward drive clutch discs, and, on the other hand, the driving clutch discs 110 and the driven clutch discs 114 are similarly arranged to constitute a set of reverse drive clutch discs. Though not shown in detail in the drawing, each of the driving and driven clutch discs comprise friction facings or friction linings which are made of impregnated paper and which are designed to operate in a hydraulic fluid.

Designated by reference numerals 116 and 118 are annular pressure plates which are disposed at the axially outward ends of the clutch drum 88 and fixed thereat axially outwardly of the clutch drum so that the plates 116 and 118 can generate a reaction force against the pistons 92 and 94 when the pistons are moved toward the plates for engagement of the clutches.

The pistons 92 and 94 respectively cooperate with the partition wall 88a to define therebetween clutch actuation pressure chambers 120 and 122 which respectively communicate with fluid passages 124 and 126 formed in the clutch input shaft 82. The clutch input shaft is further formed with a fluid passage 128 from which are branched a plurality of port passages 130 and 132 respectively opening to the bushings 104 and 106 and into the clutch chambers 84a and 86a. The fluid passages 124 and 126 are respectively fluidly connected to annular grooves 134 and 136 through radially extending ports 138 and 140, while the fluid passage 124 opens to the axial end of the clutch input shaft. The passages 124 and 126 respectively define portions of clutch actuation conduit means which fluidly interconnect the pump 72 and the clutches 84 and 86 for supplying therethrough the pressurized fluid produced by the pump to the clutches. The passage 128, on the contrary, defines a portion of lubrication conduit means which fluidly interconnect the torque converter and the clutches for conducting therethrough the fluid exhausted from the torque converter to the clutches mainly for lubrication of their friction facings.

In the flange portion 64a of the sleeve shaft 64 are formed port passages 142, 144 and 146 which are respectively fluidly connected to the delivery port of the pump 72, the annular fluid passage 78 and the annular fluid passage 76. The pump body 70 cooperates with the flange portion 64a to form therewithin a fluid passage 148 which has one end communicating with the induction port of the pump and another end fluidly connected to a suction piping 150. The leading end of the suction piping 150 is connected to an oil filter or a fluid screen 152 which is immersed in a hydraulic fluid contained in a fluid reservoir 154.

The fluid pressure produced by the pump 72 is supplied to a pressure regulator valve 156 through clutch actuation conduit means including the port passage 142 to act thereon at its inlet port 156a directly and at its port 156b through a flow restriction 156c. The fluid pressure produced by the pump 72 is also supplied to a shut-off valve 158 through the clutch actuation conduit means to act thereon at its first port 158a. The pressure regulator valve 156 comprises a housing 156d defining a cylindrical bore 156e and a valve spool 156f axially movably received in the bore 156e. The housing 156d is formed with the foregoing ports 156a and 156b and further with a first drain port 156i communicating with the fluid reservoir 154 and a second drain port 156j communicating with the lubrication conduit means through a flow restriction 156k. The valve spool 156f has axially opposed end portions respectively exposed to the pressure in the clutch actuation conduit means and the pressure produced by springs 156g whereby the valve spool is movable in response to changes in the magnitude of the pressure in the clutch actuation conduit means. More specifically, at the right-hand end of the valve spool 156f are arranged the springs 156g for biasing the valve spool in the left-hand direction, as viewed in the drawing. At the left-hand end of the valve spool 156f is formed a space 156h which is fluidly connected to the clutch actuation conduit means through the port 156b and the flow restriction 156c for conducting thereto a fluid pressure produced by the pump 72.

When the pressure in the space 156h is high enough, i.e., when the pressure in the clutch actuation conduit means or the pressure produced by the pump 72 is high enough, the valve spool 156f is moved against the springs 156g to a position where it opens the first drain port 156i for draining the clutch actuation conduit means thereby to prevent an excess pressure from being supplied to the shut-off valve 158. When the pressure in the space 156h is equal to or lower than a predetermined level, the force produced by the springs 156g prevails thereover. Consequently, the springs 156g bias the valve spool 156f to move in the left-hand direction toward a position where the valve spool closes the first drain port 156i. By these axial movements of the valve spool in response to changes in the pressure in the space 156h, the pressure in the clutch actuation conduit means is regulated to a predetermined proper value. The second drain port 156j is arranged with respect to the first drain port 156i such that the valve spool 156f opens the second drain port slightly earlier than the first drain port when moved in the right-hand direction, as viewed in the drawing.

The fluid exhausted from the second drain port 156j is led into an oil filter 160, while is situated in the lubrication conduit means, to be subjected to filtration and then supplied to the fluid passage 128. In case the filter 160 is clogged, a relief valve 162 opens to bypass the filter thereby to retain at all times the supply of lubrication fluid to the fluid passage 128, while at the same time breakage of lubrication conduit means, particularly the portion thereof located upstream of the filter is prevented.

The shut-off valve 158 comprises a housing 158b defining a cylindrical bore 158c and a valve spool 158d axially movably received in the bore. The housing 158b is formed with the foregoing first drain port 158a communicating with the pump and the pressure regulator valve 156, a second port 158e communicating with an inlet port 166a of a manual selector valve 166 and a drain port 158f communicating with the fluid reservoir 154. The valve spool 158d is operatively connected to a vehicle brake pedal 164 thereby to move in connection with the stroke thereof. When the brake pedal 164 is depressed, the valve spool 158d is moved in the left-hand direction, as viewed in the drawing, to the position where it closes the first port 158a. Thus, communication between the first port 158a and the second port 158e tends to be interrupted in accordance with the magnitude of the depression of the brake pedal while communication is provided between the second port 158e and the drain port 158f. Thus, when the brake pedal is depressed, communication tends to be established between the inlet port 166a of the manual selector valve 166 and the fluid reservoir 154.

The manual selector valve 166 comprises a housing 166b defining a cylindrical bore 166c and a valve spool 166d axially movably received in the bore. The housing is formed with the foregoing inlet port 166a, first and second outlet ports 166e and 166f respectively connected to the passages 124 and 126, and first and second drain ports 166g and 166h communicating with the fluid reservoir 154. The valve spool 166d is operatively connected to a shift lever 168 which is operated by a vehicle driver and which has shift positions including a forward drive shift position (F), a neutral drive shift position (N) and a reverse drive shift position (R). When the shift lever is placed in the position (N), the valve spool 166d closes the inlet port 166a while establishing communications both between the first outlet port 166e and the first drain port 166g and between the second outlet ports 166f and the second drain port 166h. When the shift lever is placed in the position (F) as viewed in the drawing, the valve spool 166d provides communication between the inlet port 166a and the second outlet port 166f while closing the second drain port 166h and maintaining communication between the first outlet port 166e and the first drain port 166g. When the shift lever 168 is placed in the position (R), the valve spool 166d provides communication between the inlet port 166a and the first outlet port 166e while closing the first drain port 166g together with opening the second drain port 166h thereby establishing communication between the second drain port 166h and the second outlet port 166f.

The housing 166b of the manual selector valve 166 is further formed with two ports 166i and 166j which are arranged to open on either side of and in close proximity to the land 166k when it assumes a position where it closes the inlet port 166a. The ports 166i and 166j are fluidly connected to the ports 170a and 170b of a modulator valve 170 which comprises a housing 170c defining therein a small cylindrical bore 170d and a large cylindrical bore 170e. A small bore piston 170f is axially movably received in the small cylindrical bore 170d and a large bore piston 170g is axially movably received in the large cylindrical bore 170e. A spring 170l is arranged for biasing the above two pistons apart from each other. At one axial end of the modulator valve to which end the piston 170g is normally closely located, is arranged a check valve 172 which comprises an orifice 172a through which the port 170b communicates with a pressure chamber 170h. At another axial end of the modulator valve, the small bore piston 170f cooperates with the housing 170c to define a pressure chamber 170i to which is opened at all times the port 170a but to which is communicable a port 170j. The modulator valve 170 is further formed with a port 170k through which the fluid pressure in the chamber 170h is relieved when the check valve 172 opens in response to the condition that the pressure in the pressure chamber 170h is high enough relative to the pressure prevailing at the port 170b.

The pump 72 discharges fluid under pressure which is partially supplied to the torque converter 60 through the passage 142, a flow restriction 174, the passage 144 and the annular passage 78. The fluid supplied to the torque converter is then returned therefrom through the annular passage 76 and the passage 146 and flows to a converter pressure regulator valve 176 which maintains the converter pressure at a predetermined value. The fluid returned or exhausted from the converter then passes through the valve 176 and flows to an oil cooler 178 and further to the oil filter 160. In case that the torque converter fluid return path, for example between the converter and the oil cooler, is accidentally blocked, a relief valve 180 is opened to exhaust the torque converter working fluid supply conduit means whereby the torque converter pressure is prevented from rising to a dangerously high value thereby to prevent breakage of the converter.

A relief valve 182 is provided for draining the lubrication conduit means when the pressure in said conduit means is higher than a proper value thereby to further assure the safety of the torque converter against breakage.

The operation of the above described power transmission according to the present invention will be explained hereinafter.

When the shift lever 168 assumes the forward drive shift position (F), as viewed in the drawing, which is manually selected by a vehicle driver, the valve spool 166d of the manual selector valve 166 is moved to a position where communication is established between the inlet port 166a and the second outlet port 166f. Through these ports 166a and 166f and further through the annular groove 134, the port 138 and the passage 124, fluid under pressure is supplied to the clutch actuation pressure chamber 120 thus the piston 92 moves in the left-hand direction, as viewed in the drawing, thereby to cause the forward drive clutch 84 to be engaged. When the forward drive clutch 84 is engaged, the ring gear 100 rotates driven by the torque of the output shaft 62 of the torque converter since the torque is transmitted therefrom to the ring gear through the input shaft 80 of the torque converter and the clutch 84. The ring gear 100 is in mesh with the forward drive gearing (not shown) through which the torque is transmitted to vehicle driving wheels (also not shown). Thus, the vehicle is driven to move in a forward direction when the forward drive clutch 84 is engaged.

When the shift lever 168 assumes the reverse drive shift position (R), the selector valve 166 provides communication between the inlet port 166a and the first outlet port 166e thereby to cause the reverse drive clutch 86 to be engaged since the fluid under pressure is supplied from the pump to the clutch actuation pressure chamber 122 through the inlet port 166a and the first outlet port 166e, and further through the annular groove 136, the port 140 and the passage 126 thereby to cause the piston 94 to move in the right-hand direction, as viewed in the drawing. The ring gear 102 thus rotates driven by the torque transmitted from the output shaft of the converter through the input shaft 80 of the clutch and the reverse drive clutch 86. The gear 102 is in mesh with reverse drive gearing (not shown) through which a reverse driving torque is transmitted to the vehicle driving wheels (not shown). Thus, the vehicle is driven to move in the reverse direction when the reverse drive clutch 86 is engaged.

When the vehicle is driven in either forward or reverse drive, communication is established between each of the ports 170a and 170b of the modulator valve 170 and the inlet port 166a of the manual selector valve 166 through one of the ports 166i and 166j thereby to transmit the fluid pressure to the modulator valve 170 for actuation of the pistons 170f and 170g, while at the same time fluid pressure is supplied to either clutch 84 or 86 through one of first and second outlet ports 166e and 166f. Since the piston 170g has a larger diameter than the piston 170f, the piston 170g drives the piston 170f via the spring 170l to its most leftward position where communication is interrupted between the ports 170a and 170j. Consequently, the fluid pressure supplied to either clutch 84 or 86 through the corresponding outlet port 166e or 166f is maintained at an appropriately high level thereby to assure the definite engagement of the appropriate clutch, while the supply of working fluid to the torque converter is adequately maintained since the fluid pressure is also maintained at an adequately high level in the passage connecting the pump and the selector valve via the shut-off valve. Thus, when the vehicle is driven, sufficient fluid exhausted from the converter is retained so as to be adequately supplied into the passage 128 through the relief valve 176, the oil cooler 178 and the oil filter 160. The fluid inducted into the passage 128 is then supplied to the bushings 104 and 106 and to the clutches 84 and 86, particularly into the spaces defined between the driving clutch discs 108 and 110 and the driven clutch discs 112 and 114, whereby the clutch discs, particularly the clutch facings made of impregnated paper are lubricated by more than an adequate amount of fluid.

When the shift lever 168 assumes a neutral shift position (N), the valve spool 166d of the selector valve 166 is moved to a positon where it closes the inlet port 166a while establishing communications between the first outlet port 166e and the first drain port 166g and between the second outlet port 166f and the second drain port 166h respectively. The clutch 84 or 86 having been engaged is thus disengaged thereby to cause the vehicle to come to a standstill since torque cannot be transmitted from the clutch input shaft 80 to the vehicle driving wheels (not shown) through the disengaged clutches 84 and 86. In this shift position (N) of the selector valve, a sufficient supply of clutch lubrication fluid is also maintained since the inlet port 166a of the selector valve 166 is closed by the valve spool 166d and thus the pressure is maintained at an adequately high level in the passage connecting the pump and the shut-off valve.

In the shift position (N), the ports 166i and 166j and resultantly the ports 170a and 170b are cut off from the supply of fluid pressure thereby to cause the pistons 170f and 170g to separate from each other and move toward the respective positions as depicted in the drawing by the action of the spring 170l. When the vehicle driver then shifts the shift lever 168 from the neutral position (N) to the forward or reverse drive position (F) or (R), one of the ports 166e and 166f is subject to the supply of the fluid pressure conducted from the inlet port 166a thereby to cause development of the pressure in the passage connecting the first outlet port 166e and the clutch actuation chamber 122 or in the passage connecting the second outlet port 166f and the clutch actuation chamber 120. The fluid pressure acting on the inlet port 166a is further supplied to the ports 170a and 170b of the modulator through one of the ports 166i and 166j thereby to actuate the pistons 170f and 170g to move against one another. By the effect of the orifice 172a arranged in the check valve 172, the pressure is more quickly developed in the pressure chamber 170i than in the pressure chamber 170h thus causing the piston 170f to move in the right-hand direction as viewed in the drawing while the piston 170g remains in its initial position which is the position as depicted in the drawing. By this right-hand movement of the piston 170f, communication is established between the ports 170a and 170j thus causing the reduction of the pressure supplied to either clutch 84 or 86 whereby the smooth engagement of the clutch is achieved. With the lapse of a certain time after the shift lever has been shifted as above, the pressure in the chamber 170h is elevated to a magnitude equal to the pressure present in the port 170b. Then, the piston 170g is moved in the left-hand direction overcoming the counter force applied thereto from the piston 170f through the spring 170l since the piston 170g has a diameter larger than the piston 170f. As a result, the piston 170f is gradually forcibly moved in the left-hand direction toward its most leftward position as shown in the drawing. The piston 170f thus gradually closes the port 170j whereby the clutch engagement force is gradually increased for starting the vehicle smoothly since the pressure directing the required clutch 84 or 86 gradually increases at a speed corresponding to the speed at which the port 170j is closed. When the shift lever 168 is shifted from the forward or reverse position to the neutral position, the supply of the fluid pressure from the selector valve to the modulator valve is eliminated. Then, the fluid pressure having been developed in the pressure chamber 170h applies a force on the check valve 172 to open it whereby the pressure in the chamber 170h is exhausted through the port 170k.

When the vehicle brake pedal 164 is depressed, the valve spool 158d of the shut-off valve 158 tends to close the first port 158a while at the same time to provide communication between the drain port 158f and the second port 158e. Consequently, the fluid pressure to be supplied to the required clutch 84 or 86 is reduced thus causing the clutch to be semi-clutched. Upon this situation, since the first port 158a is either partially or completely closed, the pressure increases in the passage connecting between the pump and the shut-off valve thereby causing the valve spool 156f of the pressure regulator valve 156 to move in the right-hand direction toward a position where it opens the second drain port 156j to drain the passage between the pump and the shut-off valve. The fluid drained from the second drain port 156j is conducted through the flow restriction 156k to the lubrication conduit means and added to the fluid passing therethrough from the converter to the housings 104 and 106 and the clutches 84 and 86. By this addition of the fluid drained from the pressure regulator valve 156, the amount of lubrication fluid supplied to the clutches finally through the passage 128 is increased when the brake pedal is depressed. Therefore, when the required clutch is in the semi-clutched condition, the clutch is supplied with lubrication fluid the amount of which is increased as compared to the amount normally supplied. Accordingly, the clutch discs 108, 110, 112 and 114 are capable of being optimally lubricated by a more than sufficient amount of fluid when the clutch discs loosely engage one another.

The above-described arrangement for increasing the amount of lubrication fluid does not require a pump with increased capacity because the increased portion of lubrication fluid is obtained by reducing the amount of drain fluid to be returned to the fluid reservoir. Accordingly, clutches having friction facings made of impregnated paper can be employed in the power transmission without increasing its cost.

Instead of the foregoing arrangement for increasing the amount of lubrication fluid when the clutch 84 or 86 is semi-clutched, the amount of lubrication fluid can be increased by an arrangement in which the restriction bore of the flow restriction 174 is enlarged, because such flow restriction will allow an increased amount of working fluid to pass therethrough and to flow into the torque converter 60 thereby to increase the amount of fluid exhausted or returned from the converter and consequently increase the lubrication fluid for the clutches and the bushings. However, such arrangement having the flow restriction with an increased bore encounters a drawback that the clutches become less responsive to changes in the shift position of the shift lever 168 since upon actuation of the appropriate clutch the pressure increases slowly in the clutch actuation conduit means whereby, it takes an undesirably long time for the clutch to become effective.

Figure 1:
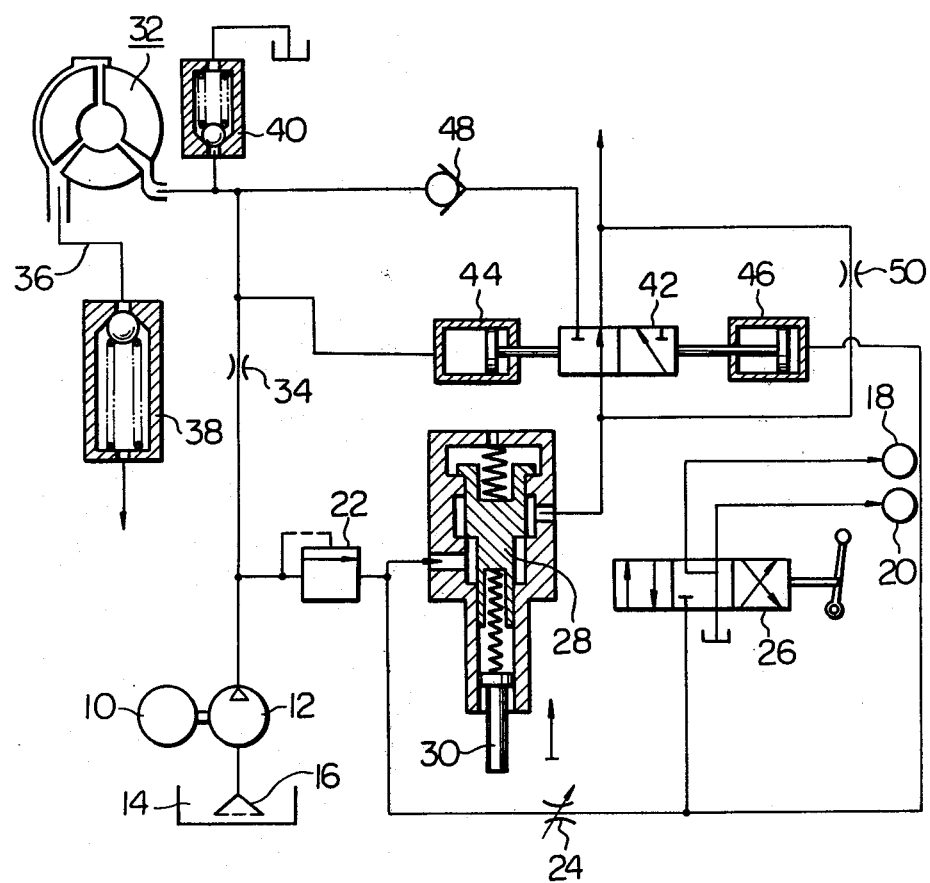
FIG. 1 is a diagrammatic view of a conventional fluid control system for controlling a power transmission equipped with clutches having friction facings made of impregnated paper.

From the foregoing description, it will be appreciated that the power transmission according to the present invention comprises a fluid control system which is simple in structure, because as compared to the conventional control system shown in FIG. 1, the control system of the transmission according to the present invention does not require the relief valve 22 and the control valve 42 and the sensing devices 44 and 46.

It will be further appreciated that the power transmission according to the present invention is constructed such that the amount of lubrication fluid fed to the clutch facings is increased when the clutches are in the semi-clutched condition.

It will be still further appreciated that the power transmission according to the present invention is constructed so that it can be equipped with clutches having friction facings made of impregnated paper in place of clutches having friction facings made of metal without deteriorating clutch performance and reducing the life of the clutch and wherein the fluid control system is simple in structure whereby the cost of the power transmission is reduced remarkably.

Figure 3:
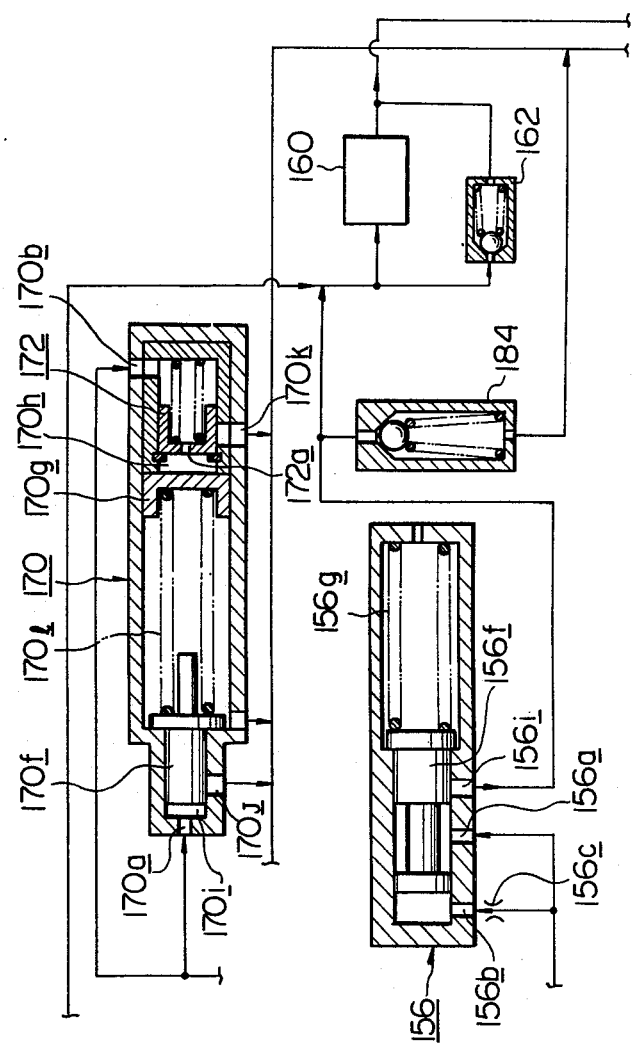
FIG. 3 is a diagrammatic view of another preferred arrangement of a portion of the fluid control system shown in FIGS. 2a and 2b.

FIG. 3 shows a portion of the fluid control system with a construction different from that shown in FIG. 2b. In FIG. 3, like parts with respect to FIGS. 2a and 2b are designated by like characters of reference.

In this embodiment, a pressure regulator valve 156 does not include the second drain port 156j and the flow restriction 156k as is provided in the embodiment in FIG. 2, but includes a first drain port 156i communicating with the oil filter 160. A bypass passage is branched from the passage connecting the port 156i and the oil filter 160, and extends through a relief valve 184 to communicate with the fluid reservoir 154.

When the vehicle brake pedal is depressed to move the engaged clutch to a semi-clutched position, the fluid drained from the port 156i is supplied to the lubrication conduit means thereby to increase the amount of the lubrication fluid supplied to the clutch in the semi-clutched condition. The relief valve 184 is arranged in the bypass passage to function as follows. When the engine rotates at a speed high enough to cause the pump to discharge an excess amount of fluid into the clutch actuation conduit means, the pressure regulator valve 156 opens its drain port 156 for draining therethrough a considerable amount of fluid. As a result, an excess backpressure tends to be created in the passage connected to the drain port 156i. Such an excess backpressure would normally prevent the pressure regulator valve from draining properly. However, the production of such an excess backpressure, is prevented by a relief valve 184 which is provided to open upon the above condition occurring to partially induct the fluid from the port 156i through the bypass passage to the reservoir 154 whereby the pressure regulator valve is free from the influence of such backpressure and can operate properly even when the amount of fluid passing therethrough increases excessively.

As readily understood, the production of such a backpressure can also be prevented by modifying the relief valve 182 to have a properly increased capacity.

What is claimed is:

1. A power transmission for use in the driveline of an engine-powered industrial vehicle, comprising:
a torque converter connected in torque transmission relationship to the engine of the vehicle;
fluid actuated clutch means connected in torque transmission relationship to said torque converter for transmitting the torque from said torque converter to drive gearings of the vehicle, said clutch means including at least one clutch having clutch facings which operate in hydraulic fluid;

a fluid reservoir containing a hydraulic fluid;

a pump taking thereinto the hydraulic fluid from said reservoir and discharging hydraulic fluid under pressure;

clutch actuation conduit means interconnecting said pump and said clutch means;

torque converter working fluid supply conduit means interconnecting said pump and said torque converter and having arranged therein a flow restriction for restricting the supply of fluid to said torque converter;

lubrication conduit means interconnecting said torque converter and said clutch means to conduct the fluid exhausted from said torque converter to said clutch means for lubrication of said clutch facings, said lubrication conduit means having arranged therein a converter pressure regulator valve for maintaining the converter pressure at a predetermined value;

a pressure regulator valve operatively connected to said clutch actuation conduit means for regulating the hydraulic fluid pressure discharged from said pump to a predetermined value by draining said clutch actuation conduit means when the pressure therein is above a predetermined value;

a manual selector valve situated in said clutch actuation conduit means and partly defining a portion thereof, said selector valve having shift positions for distributing selectively the regulated fluid pressure to said clutch means for engagement thereof and a shift position for cutting off the supply of the regulated fluid pressure to said clutch means while draining same for thereby causing disengagement of said clutch means;

a shut-off valve situated in said clutch actuation conduit means and partly defining a portion thereof, located between said clutch means and said pressure regulator valve, said shut-off valve having a first position for providing communication between said pump and said clutch means and a second position for restricting communication between same simultaneously with draining said clutch actuation conduit means for thereby reducing the fluid pressure to be supplied to said clutch means; and branch conduit means interconnecting said pressure regulator valve and said lubrication conduit means for conducting the fluid exhausted from said pressure regulator valve to said lubrication conduit means.

2. A power transmission as claimed in claim 1, in which said shut-off valve comprises a housing defining a cylindrical bore, said housing having a first port communicating with said pump, a second port communicating with said clutch means and a drain port communicating with said reservoir, and a valve spool axially movably accommodated in said bore for selectively establishing communication between said first, second and drain ports, said valve spool being operatively connected to a vehicle brake pedal thereby to move in connection with the stroke of the vehicle brake pedal, wherein said first port is fluidly connected to said second port when said valve spool is in said first position, and said first port is in restricted communication with said second port while said second port is fluidly connected to said drain port when said valve spool is in said second position.

3. A power transmission as claimed in claim 1, in which said pressure regulator valve comprises a housing defining a cylindrical bore and a valve spool axially movably accommodated in said bore, said valve spool having axially opposed end portions respectively exposed to the pressure in said clutch actuation conduit means and the pressure produced by a spring whereby said valve spool is movable in response to changes in the magnitude of the pressure in said clutch actuation conduit means, said housing having an inlet port connected to said clutch actuation conduit means and a drain port connected to said lubrication conduit means and communicable with said reservoir via a relief valve, wherein said valve spool interrupts communication between said inlet port and said drain port when the pressure in said clutch actuation conduit means is lower than a predetermined value and establishes communication between same when the pressure in said clutch actuation conduit means is higher than a predetermined value.

4. A power transmission as claimed in claim 1, in which said pressure regulator valve comprises a housing defining a cylindrical bore and a valve spool axially movably accommodated in said bore, said valve spool having opposed end portions respectively exposed to the pressure in said clutch actuation conduit means and the pressure produced by a spring whereby said valve spool is movable in response to changes in the magnitude of the pressure in said clutch actuation conduit means, said housing having an inlet port connected to said clutch actuation conduit means, a first drain port communicating with said reservoir and a second drain port connected via a flow restriction to said lubrication conduit means, said inlet port and said first and second drain ports being arranged to cooperate with said valve spool such that as the pressure in said clutch actuation conduit means increases to a high value said valve spool is moved to a position where it establishes communication between said inlet port and said second drain port and as the pressure in said clutch actuation conduit means further increases beyond said high value said valve spool is further moved to another position where it establishes communication between said inlet and both of said first and second drain ports.

* * * * *